US010738397B2

(12) United States Patent
Zafiroglu et al.

(10) Patent No.: US 10,738,397 B2
(45) Date of Patent: Aug. 11, 2020

(54) ADHESIVE PROPAGATION CONTROL USING BLOCKING SUB-LAYERS

(71) Applicant: Engineered Floors LLC, Dalton, GA (US)

(72) Inventors: Dimitri Zafiroglu, Centreville, DE (US); John Joseph Matthews Rees, Chattanooga, TN (US); Stephen Tsiarkezos, Elkton, MD (US)

(73) Assignee: ENGINEERED FLOORS LLC, Dalton, GA (US)

( * ) Notice: Subject to any disclaimer, the term of this patent is extended or adjusted under 35 U.S.C. 154(b) by 181 days.

(21) Appl. No.: 15/664,876

(22) Filed: Jul. 31, 2017

(65) Prior Publication Data

US 2019/0032254 A1     Jan. 31, 2019

(51) Int. Cl.

| | |
|---|---|
| *B32B 7/12* | (2006.01) |
| *D04B 21/16* | (2006.01) |
| *C09J 5/06* | (2006.01) |
| *C09J 133/06* | (2006.01) |
| *C09J 7/04* | (2006.01) |
| *B32B 15/20* | (2006.01) |
| *B32B 7/027* | (2019.01) |
| *B32B 27/12* | (2006.01) |
| *B32B 7/02* | (2019.01) |
| *B32B 5/06* | (2006.01) |
| *B32B 5/26* | (2006.01) |
| *B32B 3/26* | (2006.01) |
| *B32B 7/09* | (2019.01) |

(52) U.S. Cl.
CPC ............ *D04B 21/165* (2013.01); *B32B 3/266* (2013.01); *B32B 5/06* (2013.01); *B32B 5/26* (2013.01); *B32B 7/02* (2013.01); *B32B 7/027* (2019.01); *B32B 7/09* (2019.01); *B32B 7/12* (2013.01); *B32B 15/20* (2013.01); *B32B 27/12* (2013.01); *C09J 5/06* (2013.01); *C09J 7/045* (2013.01); *C09J 133/06* (2013.01); *B32B 2262/0276* (2013.01); *B32B 2471/00* (2013.01)

(58) Field of Classification Search
CPC .. C09J 133/06; C09J 7/045; C09J 5/06; B32B 7/12; D04B 21/165
See application file for complete search history.

(56) References Cited

U.S. PATENT DOCUMENTS

| | | | |
|---|---|---|---|
| 3,948,295 A | * | 4/1976 | Lemont .................. F16L 59/02 138/147 |
| 7,122,089 B2 | | 10/2006 | Zafiroglu |

(Continued)

OTHER PUBLICATIONS

International Search Report and Written Opinion dated Nov. 15, 2018 in corresponding/related International Application No. PCT/US2018/042856.

*Primary Examiner* — Daniel McNally
(74) *Attorney, Agent, or Firm* — Patent Portfolio Builders PLLC

(57) ABSTRACT

A method for directing adhesive places blocking layers adjacent to adhesive layer within a textile sheet structure or between textile sheets, directing adhesive flow in a preferred direction away from the blocking layers. When the blocking layers are partially open to allow some adhesive flow through, adhesive flow is also directed in the planar direction away from closed areas towards open area, and can reform the adhesive layers into a preferred final three-dimensional configuration.

30 Claims, 17 Drawing Sheets

(56) References Cited

U.S. PATENT DOCUMENTS

| | | | |
|---|---|---|---|
| 7,255,761 B2 | 8/2007 | Zafiroglu | |
| 7,425,359 B2 | 9/2008 | Zafiroglu | |
| 7,431,975 B2 | 10/2008 | Zafiroglu | |
| 7,622,408 B2 | 11/2009 | Zafiroglu | |
| 8,216,659 B2 | 7/2012 | Zafiroglu | |
| 8,398,804 B2 | 3/2013 | Baqai et al. | |
| 9,243,359 B2 | 1/2016 | Zafiroglu | |
| 2004/0247821 A1* | 12/2004 | Zafiroglu | B32B 5/26 428/88 |
| 2005/0003141 A1* | 1/2005 | Zafiroglu | B32B 5/02 428/92 |
| 2005/0114989 A1* | 6/2005 | Harward | A41D 27/245 2/275 |
| 2013/0280486 A1* | 10/2013 | Zafiroglu | A47G 27/02 428/141 |
| 2016/0009052 A1* | 1/2016 | Woods, II | B32B 7/08 428/104 |

\* cited by examiner

ADHESIVE PROPAGATION CONTROL USING BLOCKING SUB-LAYERS

TECHNICAL FIELD

Embodiments of the subject matter disclosed herein relate to adhesive bonding in textile sheets and floor coverings.

BACKGROUND

Attaching dissimilar surfaces of planar textiles or textile elements using adhesives is affected by the structural dissimilarities among the surfaces. The density or porosity or affinity for adhesive among the surfaces can vary, and certain surfaces may benefit more from the propagation of adhesive. For example, textile layers are generally porous and require large amounts of adhesives to achieve secure bonding among the layers as the adhesives tend to follow the direction of lowest resistance and propagate more into the more porous layers and less into the less porous layers. Therefore, attaching porous textile layers to less porous layers is difficult. Bulky felts are generally porous, and fabrics are less porous. Attachment of a dense fabric to a bulky felt without a large portion of the adhesive propagating into the bulky felt is difficult.

Incompatibility between layers also occurs when one surface is less receptive to adhesion than the opposing surface, for example, the attachment of two textile surfaces using a polymeric adhesive more compatible with the fibers on one surface than the fibers of the other surface. The less receptive or compatible surface requires propagation of a higher percentage of the adhesive. Layers that are treated to repel fluids such as water require a higher degree of adhesive penetration to achieve a satisfactory bond.

When elements on one surface are relatively loose, these loose elements need to be secured by the propagation of adhesive upon the application or pressure as opposed to the propagation away from the loose elements and toward the adjacent textile surface. One example of such a need is the attachment a tufted fabric to a secondary textile backing with sufficient tuft security or "tuft-bind". This is conventionally achieved by simultaneously attaching the "back-laps" of the tufted yarns to the primary and secondary backings. Copious quantities of low-viscosity adhesives such as latex solutions or heavy layers of low-melting, low-viscosity polymers are typically used to reach, to contain and to secure the back-laps. As a second example, secondary under-layers attached to face fabrics that provide cushioning, for example, felts and foam layers, are porous and are difficult to secure as excessive propagation of adhesive into these cushioning under-layers occurs.

Adhesive layers contained within a textile product as it is formed also take the path of least resistance when activated. This path of least resistance tends to be undesirable for achieving the desired bonding and properties in the textile product. For example, a stitch-bonded fabric is formed with a low-melting substrate that is activated with heat and pressure. The desire is to have the activated adhesive propagate to one of the surfaces, e.g., the "technical front" or the "technical back", to increase abrasion resistance while keeping the opposite surface free of adhesive to maintain a soft textile feel. In another example concerning needle-punched fabrics such as felts, a low-melting adhesive layer is encapsulated between two fibrous layers. Creating a dense sealed and wear-resistant composite surface requires directing this adhesive to one of the two fibrous layers and away from the other fibrous layer.

In addition to directing adhesive into a desired layer, it is also desirable to direct adhesive in the planar direction between layers so that, while using a uniform adhesive sheet, textile layers can be preferentially joined at separated open spots or lines or areas arranged in different patterns for the sake of softness, or permeability, or stress control, special design effects, or other similar needs.

SUMMARY

Exemplary embodiments are directed to planar textile structures having one or more fibrous or non-fibrous elements or layers bonded or laminated to other elements or layers using a combination of adhesive layers, heat and pressure. To promote adhesion to a given internal or external element or layer the adhesive layers are placed next to a blocking sublayer that is not substantially affected by the applied heat and pressure. The adhesive layer and blocking layer may be compatible and bondable to each other. In one embodiment, the adhesive layer and blocking layer are pre-bonded to each other. In one embodiment two different adhesive layers are pre-attached or pre-bonded to either side of a partially or totally blocking layer. Alternately, the adhesive layer and blocking layer are unbondable and not pre-bonded to each other. The unbondable adhesive layer and blocking layer are pre-attached, for example, by needle-punching or stitch-bonding. In one embodiment, two separate adhesive layers are placed on each side of the blocking layer. The two separate adhesive layers can be identical or different. In one embodiment, at least one of the two adhesive layers is pre-bonded or otherwise pre-attached to a side of the blocking layer. Each blocking sublayer at least partially or completely blocks the flow of adhesive, thereby directing the propagation of adhesive toward a desired adjacent element, area, layer or sublayer that benefits from the presence of a higher amount of adhesive.

The blocking layer can be continuous or discontinuous, blocking the flow of adhesive in selected areas and allowing the flow of adhesive in other areas. A discontinuous blocking layer also forces the propagation of adhesive laterally along the layers from the blocked areas to the open areas. Suitable blocking layers are compatible with the adhesive and are bonded during the laminating or adhesive bonding of the planar textile structure. Alternatively, the blocking layers are incompatible with the adhesive layer, and penetrating yarns or fibers are utilized to secure the blocking layers in the desired locations within the layers of the composite textile structure.

In one embodiment, at least one partially or fully blocking layer is placed adjacent to one or more adhesive layers to preferentially direct adhesive flow in the normal direction towards the adjacent textile layers or elements bonded by the adhesives. In another embodiment, a textile sheet is formed with at least one internal adhesive layer surrounded by penetrating fibers or yarns encapsulating the adhesive layer, and a blocking layer is placed over or under the at least one internal adhesive layer to direct adhesive flow towards the surface of the fabric located on an opposite side of the at least one internal adhesive layer from the blocking layer. In one embodiment, a blocking layer is placed against an adhesive layer, and a second textile layer is placed above the adhesive layer. All layers are penetrated by a pattern of fibers or yarns originating from a first textile layer. As pressure and heat are applied, the textile layers are joined, and a majority of the adhesive propagates to the layer placed against the adhesive. The adhesive secondarily follows the path of the fibers protruding through the blocking layer and into the second textile layer placed above the adhesive layer.

In another embodiment, two composite textile layers are formed either by the same process or by different processes. Each composite textile layer contains an adhesive layer adjacent to a blocking layer. Both the blocking layer and the adhesive layer within each composite textile layer are penetrated by fibers or yarns, and the fibers or yarns are exposed on both surfaces of each composite textile layer. The two composite textile layers are placed against each other such that the contained adhesive layers within each composite textile layer face each other and are between the blocking layers in the composite textile layers. Heat and pressure are applied from at least one exposed face to join the two composite textile layers and simultaneously encapsulate parts of the penetrating fibers or yarns that protrude beyond each adhesive layer contained within each composite textile layer.

In one embodiment, a partially-open blocking layer, for example, a pre-punched or pre-perforated layer, is placed against one or more adhesive layers. In addition to directing adhesive flow towards the layer or layers adjacent to the adhesive layers, the partially-open blocking layer directs adhesive in the planar direction to the open areas and block flow to the adjacent closed areas. Bonding between the layers or elements occurs within the pre-selected pre-punched or pre-perforated open areas. Deeper and stronger bonds in selected areas may be more desirable and effective rather than weaker bonding throughout the area. The differential propagation of adhesive into the open areas can also cause the automatic transformation of a flat adhesive layer into a three-dimensional configuration, helping to relieve planar stress with changes of temperature or pressure.

Exemplary embodiments are directed to a method for directing adhesive when bonding layers. An adhesive layer is placed between a first layer and a second layer. In one embodiment, the adhesive layer is a liquid adhesive layer. In one embodiment, the first layer is a stitch-bonded fabric, a tufted fabric, a needle-punched fabric, a nonwoven fabric, a non-fibrous layer, cardboard, expanded polystyrene, a metal foil, a metal screen, a plastic, a polymer or an elastomer. In one embodiment, the second layer is a stitch-bonded fabric, a tufted fabric, a needle-punched fabric, a nonwoven fabric, a non-fibrous layer, cardboard, expanded polystyrene, a metal foil, a metal screen, a plastic, a polymer or an elastomer.

A blocking layer is placed between the adhesive layer and at least a portion of one of the first layer and the second layer. The blocking layer at least partially blocks a flow of the adhesive layer toward the portion of one of the first layer and second layer. In one embodiment, the blocking layer is a partially open layer or a perforated layer. In one embodiment, the blocking layer is placed between the adhesive layer and all of at least one of the first layer and the second layer.

At least one of heat and pressure are applied to create the flow of the adhesive layer to bond the first layer to the second layer using the adhesive layer.

In one embodiment, the adhesive layer is a thermoplastic layer having an adhesive layer melting point. In addition, the first layer has a first layer melting point, and the second layer has a second layer melting point. The blocking layer has a blocking layer melting point, and the adhesive layer melting point is lower than the first layer melting point, the second layer melting point and the blocking layer melting point. Therefore, a bonding temperature greater than or equal to the adhesive layer melting point and less than the first layer melting point, the second layer melting point and the blocking layer melting point is used.

In one embodiment, the blocking layer is placed between the adhesive layer and at least a portion of the second layer, at least one of the blocking layer and the adhesive layer is attached to the second layer before applying at least one of heat and pressure to bond the first layer to the second layer using the adhesive layer. In one embodiment, a secondary adhesive layer is placed between the second layer and the blocking layer, and heat and pressure are applied to the blocking layer and second layer to bond the blocking layer to the second layer using the secondary adhesive layer. In one embodiment, a plurality of discrete fiber tufts is formed extending along a bottom face of the second layer, through the second layer, blocking layer, and the adhesive layer to attach at least one of the blocking layer and the adhesive layer to the second layer. In one embodiment, the plurality of discrete fibers is formed by needle punching the discrete fibers from the bottom face and through the second layer, blocking layer and adhesive layer.

In one embodiment, at least one of the adhesive layer and blocking layer are attached to the second layer by stitching at least one of the adhesive layer and the blocking layer to the second layer. In one embodiment, the first layer is a preformed textile face layer that is a tufted fabric, a woven fabric, a knit fabric, a needle-punched fabric, a spun-bonded fabric, a spun-laced fabric, a stitch-bonded fabric or a pre-bonded carded fabric. In one embodiment, the first layer includes a plurality of staple fibers, and the second layer includes a plurality of staple fibers. The staple fibers are needle punched from the first layer, through the adhesive layer and blocking layer and into the second layer before applying at least one of heat and pressure.

In one embodiment, the blocking layer includes blocking areas that block a flow of the adhesive layer toward the portion of one of the first layer and second layer and open areas that allow the flow of the adhesive layer toward the first layer and the second layer. In one embodiment, the blocking layer is a perforated film, a plurality of separate strips of material spaced from each other or a scrim formed by combining a plurality of yarns. In one embodiment, the blocking layer is a polyester film having a thickness of about 0.0005 inches. In one embodiment, the blocking layer has a variable thickness between the first layer and the second layer.

Exemplary embodiments are directed to a method for directing adhesive within a stitchbonded fabric. An adhesive layer is placed in contact with a blocking layer, and the blocking layer at least partially blocks a flow of the adhesive layer. Yarns are stitched through the adhesive layer and the blocking layer to form a technical front and a technical back of the stitchbonded fabric. At least one of heat and pressure is applied to create a flow of the adhesive layer. The blocking layer directs the flow of adhesive toward one of the technical front and the technical back. In one embodiment, the blocking layer is a metal foil.

In one embodiment, the blocking layer is attached to the adhesive layer before stitching yarns through the adhesive layer. In one embodiment, two separate adhesive layers are placed in contact with the blocking layer such that the blocking layer is disposed between the adhesive layers. In one embodiment, the blocking layer is attached to the adhesive layers before stitching yarns through the adhesive layer.

Exemplary embodiments are directed to a method for forming a composite with a fabric layer. At least one of a blocking layer, an adhesive layer and a primary backing are combined and yarns are pushed through the at least one of the blocking layer, the adhesive layer and primary backing to form the fabric layer. The fabric layer is placed in contact with a second layer, and heat and pressure are applied to bond the at least one of the blocking layer, the adhesive layer and primary backing in the fabric layer and to bond the fabric layer to the second layer.

In one embodiment, a secondary blocking layer is attached to the second layer, and a secondary adhesive layer is placed on the secondary blocking layer. The fabric layer is placed over the secondary adhesive layer with the yarns in contact with the secondary adhesive layer. In one embodiment, the yarns are pushed through the at least one of the blocking layer, the adhesive layer and primary backing to form the fabric layer by tufting the yarns through the at least one of the blocking layer, the adhesive layer and primary backing to form the fabric layer. In one embodiment, pushing yarns through the at least one of the blocking layer, the adhesive layer and primary backing to form the fabric layer includes stitchbonding the yarns through the at least one of the blocking layer, the adhesive layer and primary backing to form the fabric layer. In one embodiment, pushing yarns through the at least one of the blocking layer, the adhesive layer and primary backing includes needle punching.

Exemplary embodiments are directed to a method of directing a low melting adhesive flow towards a surface of a composite fabric. A blocking layer and a low-melting adhesive layer are placed adjacent to a filament web. The filament web is needle punched into the barrier and adhesive layers. Heat and pressure are applied to the filament web, barrier layer and adhesive layer, creating a flow of molten adhesive from the adhesive layer away from the barrier layer. In one embodiment, the blocking layer and low-melting adhesive layer are placed between a pair of filament webs.

BRIEF DESCRIPTION OF THE DRAWINGS

The accompanying drawings, which are incorporated in and constitute a part of the specification, illustrate a number of embodiments and, together with the following descriptions, explain these embodiments.

DETAILED DESCRIPTION

Figure 1:
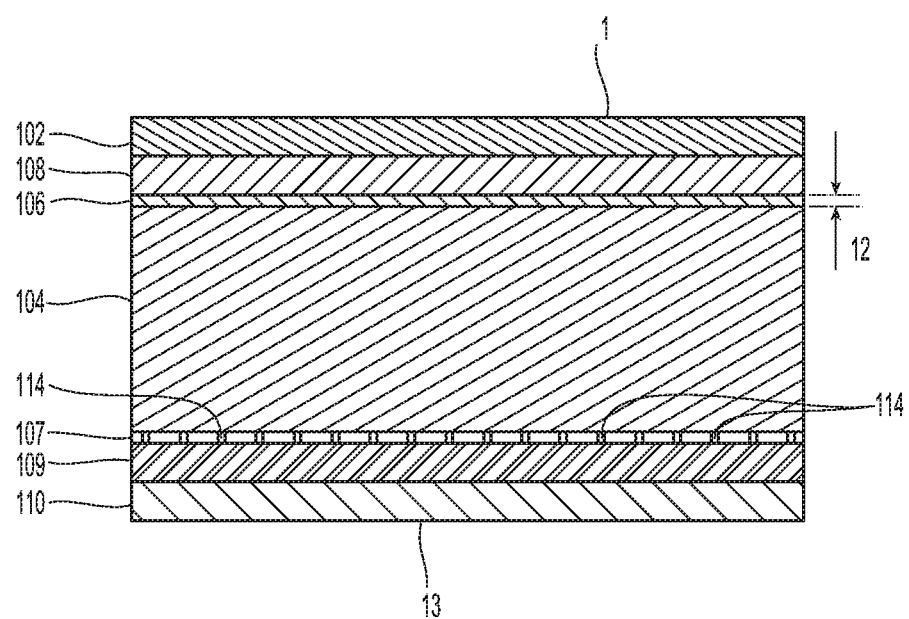
FIG. 1 is a schematic representation of an embodiment of blocking layers placed between adhesive layers and textile layers in a layered textile structure.

The following description of the embodiments refers to the accompanying figures. The same reference numbers in different figures identify the same or similar elements. Reference throughout the whole specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, particular features, structures or characteristics may be combined in any suitable manner in one or more embodiments.

Exemplary embodiments are directed to the bonding of layers together using an adhesive and a blocking layer to direct the flow of adhesive selectively between adjacent layers. The flow of adhesive is generated by the application of at least one of heat and pressure. The blocking layer is placed between the adhesive layer and at least a portion of one of the layers, inhibiting or blocking the flow of adhesive towards the covered portion of that layer. Suitable blocking layers include contiguous or interrupted blocking layers, i.e., completely blocking the local flow of adhesive, and partially blocking layers, i.e., only partially blocking the local flow.

Porous fibrous and non-fibrous layers are bonded using this combination of adhesive layers and blocking layers. A plurality of layers containing similar or dissimilar fibrous, non-fibrous, textile or non-textile elements can be combined and bonded. Suitable layers include, but are not limited to all forms of fibrous products built with staple fibers, filaments or yarns, sheets of paper, cardboard, layers of expanded polystyrene, metal foils, metal screens, plastics and polymers and elastomers in sheet form. In one embodiment, a single adhesive layer and a single blocking layer are used between a pair of layers. Alternatively, a plurality of layers is combined simultaneously using a plurality of adhesive layers and blocking layers placed among the plurality of layers. For the plurality of adhesive layers and blocking layers, at least one of the interfaces includes a partially blocking layer adjacent to an adhesive layer to direct increased adhesive flow to the surface adjacent to the adhesive layer.

In one embodiment, the blocking layer contains a plurality of openings, holes or penetrations. The holes or penetrations can be formed in the blocking layer before it is placed between layers and adjacent an adhesive layer. The holes or penetrations can be uniform across the blocking layer or can vary from region to region across the blocking layer. The holes or penetrations may define a square pattern or diagonal pattern and may be rectilinear or curvilinear. Furthermore, the holes or penetrations define a blocking pattern in the blocking layer that may vary across different areas of the blocking layer for aesthetic or functional purposes. For example, the density or shape or arrangement of the openings can be different along the edge from the openings in the middle of the blocking layer or can be intermittent along a given direction.

In one embodiment, the holes are formed in the blocking layer after the blocking layer is placed among the layers to be bonded and the adhesive layer. In one embodiment, fibers or yarns are inserted through the holes as the blocking layer is formed by stitching, tufting or needle-punching. The holes or penetrations allow some flow of adhesive through or past the blocking layer as a secondary adhesive flow. In one embodiment, this results in a partially blocking layer. The presence of the stitched, needle-punched fibers or tufted yarns through the holes or perforations also limits the flow through the holes or perforations to different degrees. The flow of adhesive through the holes will be less than the flow of adhesive away from the blocking layer on the side of the blocking layer containing the adhesive layer. Therefore, the location of the blocking layer among the layers to be bonded and the adhesive layer in combination with providing holes in the blocking layer direct a larger or disproportionate amount of adhesive toward the layer to be bonded that is on the same side of the blocking layer as the adhesive layer.

In one embodiment, the blocking layer is a flat, thin two-dimensional sheet of material. Suitable two-dimensional sheets of material include polyester films, for example, polyester films having a thickness of about 0.0005 inches. In one embodiment, the blocking layer is three-dimensional, i.e., has a thickness that varies. This produces a corresponding three-dimensional variation in the thickness of the adhesive between the layer to be bonded helping to relieve planar stresses as the final composite tends to expand or contract with changes of temperature or pressure. Suitable three-dimensional blocking layers include textured blocking layers and embossed blocking layers of solid or foraminous material. These three-dimensional blocking layers may also be able to withstand the pressure of lamination and adhesion without fully flattening.

In one embodiment, the blocking layer is pre-perforated with a plurality of holes by removing material from the perforations or by punching through the blocking layer and creating deformed holes with surrounding craters. In one embodiment, the blocking layer is an open scrim, and the strands between the openings in the scrim are formed with yarns, slit films or a flat layer molded with a pattern of openings. In one embodiment, the blocking layer contains a plurality of parallel rectilinear or curvilinear yarns or strips of material that do not intersect. Alternatively, the yarns or strips of material overlap or cross. In one embodiment, the yarns or strips of material are overlapped and stacked to form a three-dimensional blocking layer that directs the flow of adhesive in three dimensions. Spaces between yarns or strips of materials define the openings, i.e., holes or penetrations, in the blocking layer.

Referring initially to FIG. 1, exemplary embodiments are directed to a method for directing adhesive when bonding a plurality of layers, including a first layer 102 and a second layer 104. In one embodiment, the first layer 102 is a less permeable layer, and the second layer 104 is a more permeable layer. In one embodiment, an optional a third layer 110, for example, an additional less permeable layer, is bonded simultaneously or consecutively to the second layer 104. The plurality of layers is bonded together using at least one first layer of adhesive 108 between the first layer and the second layers, and a second layer of adhesive 109 between the third layer 110 to the second layer 104. The adhesive layers can be separately or simultaneously activated by applying at least one of heat and pressure from at least one of the top face 111 and the bottom face 113.

The first layer 102, second layer 104 and third layer 110 can be fibrous layers or non-fibrous layers. Suitable layers include, but are not limited to a stitch-bonded fabric, a tufted fabric, a needle-punched fabric or felt, a non-fibrous layer, cardboard, expanded polystyrene, a metal foil, a metal screen, a plastic, a polymer or an elastomer and pre-combined variations of these layers. The plurality of layers can all be of the same type of material or of different types of material. In one embodiment, the first layer 102 and the third layer are relatively thin, having a thickness of less than about 4 mm or less than about 3 mm to provide improved heat transfer through the layers when heat is preferentially applied to those layers. The various types of first, second and third layers can be used in any combination in accordance with the various embodiments for combining them using the blocking layers and adhesives as disclosed herein.

The adhesive layer 108 is placed between the first layer 102 and the second layer 104. In one embodiment, the additional adhesive layer 109 is also placed between the second layer 104 and the third layer 110 to attach the third layer 110 to the second layer 104. The adhesive layers can be single-layer or multi-layer. The adhesive layers can cover the entire adjacent layers to be bonded, as illustrated, for example, by the adhesive layer 108 between the first and second layers, or can cover only a portion of the adjacent layers to be bonded. The adhesive layers bond adjacent layers together using at least one of pressure and heat. Suitable adhesive layers include, but are not limited to, solid low-melt webs or membranes, fabrics or films. In one embodiment, a liquid adhesive layer is placed between the first layer and the second layer. Suitable adhesive layers are in the weight range of about 10 grams per square meter to about 200 grams per square meter. Suitable thicknesses for the adhesive layers are up to about 2 mm. The melt index for the adhesive layers is selected for compatibility with a given arrangement of layers. For example, an adhesive layer having a high melt index is used when layers of very low permeability are placed against an adhesive layer that is highly blocked by the blocking layer and when the adhesive flow to both adjacent layers is through a partially open blocking layer. By contrast, a low melt index is used with layers of relatively higher permeability.

Returning to FIG. 1, an impermeable blocking layer 106 is pre-attached to the second layer 104 to direct adhesive towards the first textile layer 102 and to provide a physical barrier to the flow of adhesive toward the second layer 104. The blocking layer is constructed of materials that are compatible with bonding by the adhesive layer 108.

In one embodiment, a permeable layer 107 or permeable blocking layer is placed between the second layer 104 and the additional adhesive layer 109. The permeable layer allows some adhesive to propagate through into the more permeable adjacent second layer 104 while directing the flow of adhesive mostly into the less permeable third layer 110. In one embodiment, the permeable blocking layer is compatible with or bondable by the additional adhesive layer. Alternatively, the permeable blocking layer is not compatible with or bondable by the additional adhesive layer. Compatibility is selected depending upon the degree to which the additional adhesive layer has a sufficiently high melt index and is present in sufficient quantities to bridge across to both the second and third layers. Regardless of compatibility, a higher amount of adhesive will propagate into the third layer 110 placed adjacent to the adhesive because of the location of the permeable blocking layer.

In one embodiment, the blocking layer 106 is an impermeable continuous sheet of material having a constant thickness 112. In one embodiment, this thickness is about 0.0005 inches (0.0125 mm) and can vary up to about 0.08 inches to about 0.12 inches (2-3 mm). Suitable blocking layers include, but are not limited to, films, membranes, woven layers or nonwoven layers. In one embodiment, the thickness of the blocking layer varies along the plane of the blocking layer. These variations in thickness create a three-dimensional profile or cross-section for the blocking layer. In one embodiment, this three-dimensional profile is transferred to the adhesive layer when bonding the first layer to the second layer. In one embodiment, the three-dimensional profile is translated to at least one of the adjacent layers when the layers are bonded to each other.

In another embodiment, for example as illustrated by the permeable blocking layer, the blocking layer is a discontinuous and permeable layer. In one embodiment, the blocking layer includes a plurality of discrete portions. In another embodiment, the permeable blocking layer is a film or sheet into which a plurality of holes 114 or penetrations are created. In one embodiment, the blocking layer includes both blocking areas that block a flow of the adhesive layer toward the portion of one of the layers disposed opposite the blocking layer from the adhesive layer and open areas that allow the flow of the adhesive layer toward both adjacent layers. In one embodiment, the blocking layer is a perforated film. The perforated film can be formed with the desired arrangement of perforations or holes. This desired arrangement can be uniform across the blocking layer, can vary from region to region across the blocking layer or can be a random pattern.

In one embodiment, the perforations or holes are formed in the blocking layer before the blocking layer is deployed or placed between the layers. In another embodiment, the perforations or holes are formed during a fabric formation process such as needle-punching, stich-bonding or tufting as fibers or yarns are pushed through the blocking layer and perforations or holes.

In one embodiment, the blocking layer is formed by combining a plurality of separate strips of material. For example, the blocking layer is formed as a scrim by combining a plurality of yarns. The resulting blocking layer can be a single line of material, a two-dimensional sheet or a three-dimensional structure.

Figure 2A:
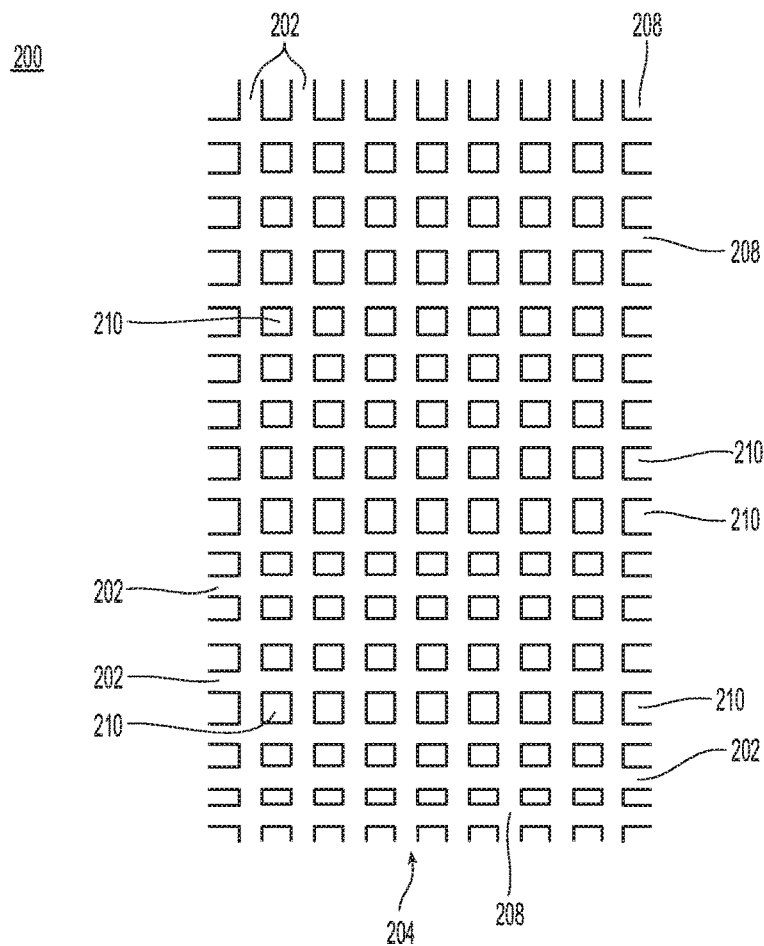
FIG. 2A is a schematic representation of an embodiment of strips of rectilinear material making a partially-open blocking layer.
Figure 2B:
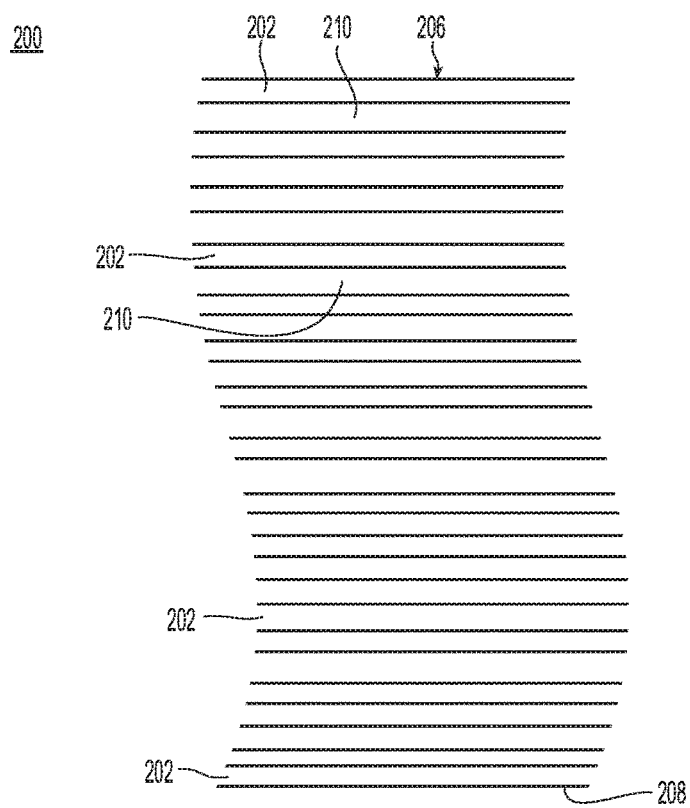
FIG. 2B is a schematic representation of another embodiment of strips of rectilinear material making a partially-open blocking layer.
Figure 3A:
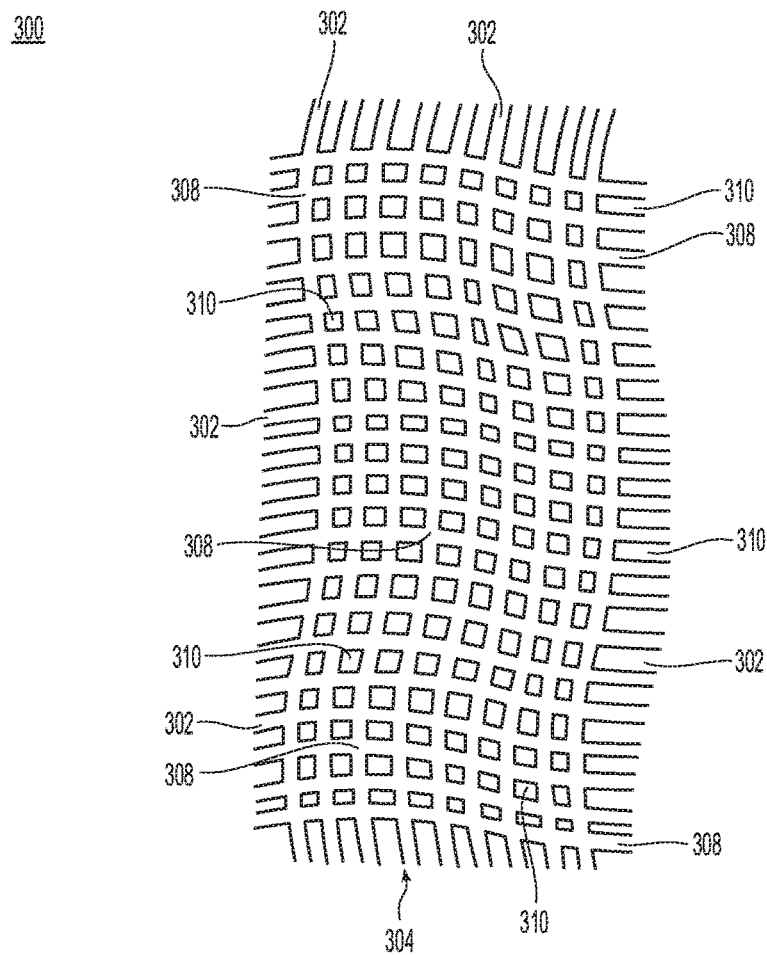
FIG. 3A is a schematic representation of an embodiment of strips of curvilinear material making a partially-open blocking layer.
Figure 3B:
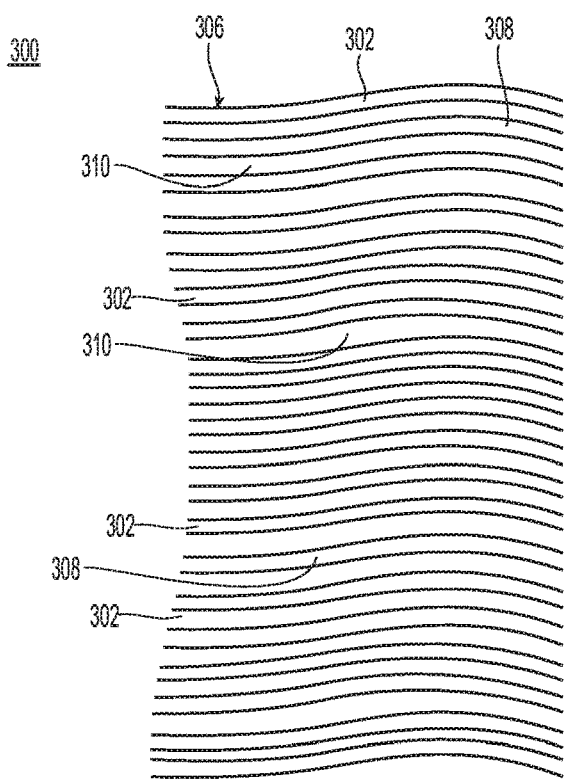
FIG. 3B is a schematic representation of another embodiment of strips of curvilinear material making a partially-open blocking layer.

Referring now to FIG. 2A, in one embodiment, the blocking layer 200 is formed from a plurality of separate flat rectilinear strips 202 of material arranged as an overlapping, interwoven or inter-bonded grid 204. The plurality of overlapping, interwoven or inter-bonded strips define blocking areas 208 and open areas 210. Referring now to FIG. 2B, in one embodiment, the blocking layer 200 is formed from a plurality of separate flat rectilinear strips 202 of material arranged as a plurality of parallel strips 206. The plurality of parallel strips defines blocking areas 208 and open areas 210. Referring now to FIG. 3A, in one embodiment, the blocking layer 300 is formed from a plurality of separate flat curvilinear strips 302 of material arranged as an overlapping grid 304. The plurality of overlapping strips defines blocking areas 308 and open areas 310. Referring now to FIG. 3B, in one embodiment, the blocking layer 300 is formed from a plurality of separate flat curvilinear strips 302 of material arranged as a plurality of parallel strips 306. The plurality of parallel strips defines blocking areas 308 and open areas 310. The rectilinear strips or curvilinear strips can be flat, substantially two-dimensional strips, or can be three-dimensional.

Figure 4:
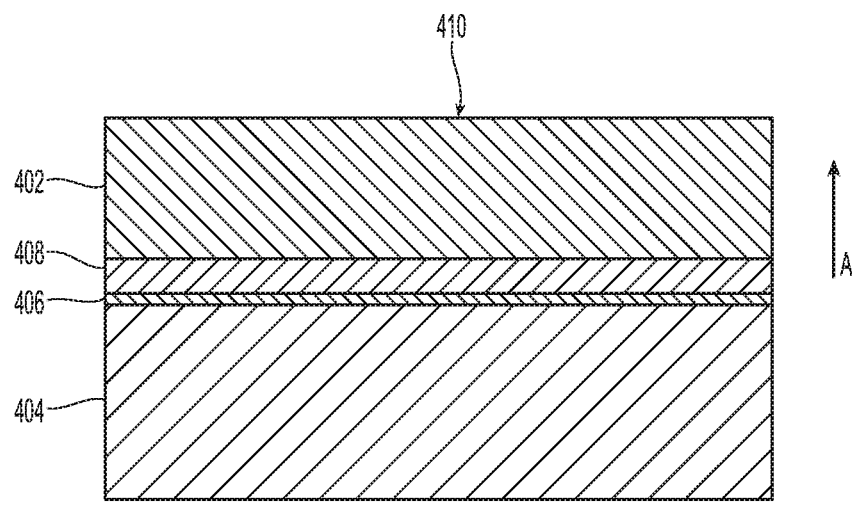
FIG. 4 is a schematic representation of layer textile sheet with the blocking layer directing the flow of adhesive into only the first layer.

Referring now to FIG. 4, in one embodiment, a continuous blocking layer 406 is pre-bonded to the more permeable second layer 404. The first less permeable layer 402 is located above the blocking layer 406, and the adhesive layer 408 is placed between the first layer and the blocking layer. The adhesive layer 408 is compatible with and bondable to the blocking layer. The blocking layer directs adhesive toward the less permeable first layer 402 in the direction of arrow A. Alternately layer 402 may also be highly permeable, and adhesive flow to its outer surface 410 is desirable to seal the surface or increase abrasion resistance. Bonding of the first layer 402 to the second layer 404 is accomplished by applying at least one of heat and pressure to at least one of the first layer and the second layer.

Figure 5:
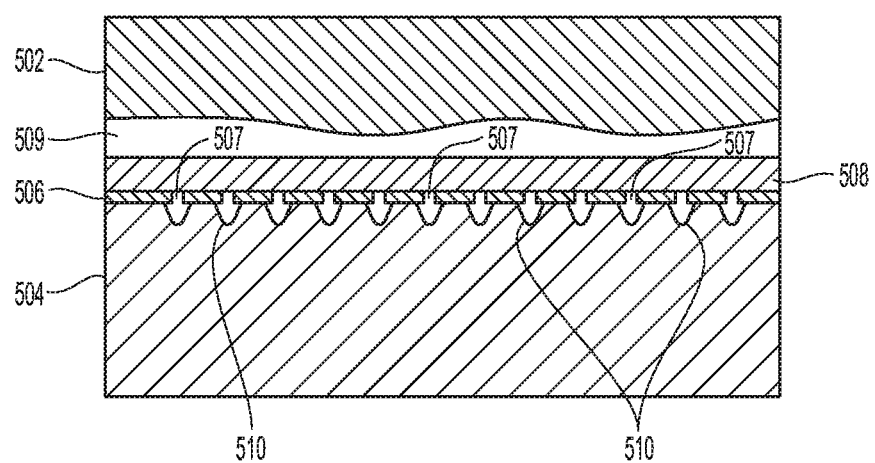
FIG. 5 is a schematic representation of the layered textile sheet with a partially-open blocking layer directing the flow of adhesive into both the first layer and the second layer.

Referring now to FIG. 5, in one embodiment, a discontinuous blocking layer 506 is located between the second layer 504 and the adhesive layer 508. The discontinuous blocking layer includes a plurality of discrete penetrations or holes 507 extending completely through the blocking layer. These holes allow a portion of the flow of the adhesive layer to pass across the blocking layer. The holes can be pre-formed in the blocking layer before the blocking layer is placed between the first layer and the second layer or formed in the blocking layer after the blocking layer is placed between the first layer and the second layer. The adhesive layer is located between the first layer 502 and the blocking layer. The blocking layer directs most of the adhesive toward the first layer while allowing a portion of the adhesive to pass through the holes and into the second layer. Therefore, bonding of the first layer to the second layer is accomplished by applying at least one of heat and pressure to at least one of the first layer and the second layer. This creates a flow of adhesive 509 into the first layer and away from the blocking layer and the second layer. This also creates a smaller flow of adhesive 510 into the second layer at discrete points corresponding to the holes in the blocking layer.

In one embodiment, the adhesive layer is constructed of material, e.g., thermoplastic films, having an adhesive layer melting point. In one embodiment, the adhesive layer melting point is less than or equal to 125° C. In addition, the first layer has a first layer melting point, and the second layer has a second layer melting point. The blocking layer has a blocking layer melting point. The first layer melting point, the second layer melting point and the blocking layer melting point are all greater than the adhesive layer melting point. Therefore, applying heat and pressure is conducted with a temperature greater than or equal to the adhesive layer melting point but less than the first layer melting point, the second layer melting point and the blocking layer melting point.

Figure 6:
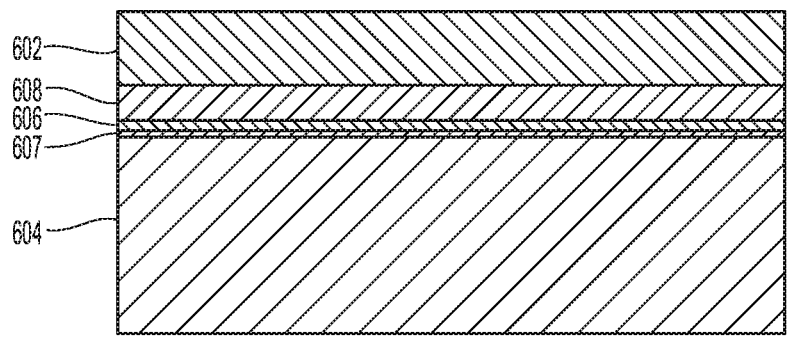
FIG. 6 is a schematic representation of an embodiment of a textile sheet with the blocking layer pre-attached to the second layer using a secondary adhesive.

Referring now to FIG. 6, in one embodiment, the blocking layer 606 is first attached to the second layer 604 using a secondary adhesive layer 607 disposed between the second layer and the blocking layer. The secondary adhesive layer can be the same as the adhesive layer 608 used to bond the first layer 602 to the second layer or can be a different type of adhesive, a different thickness of adhesive or a different melting point adhesive. In one embodiment, the blocking layer 606 is placed between the adhesive layer 608 and at least a portion or all of the second layer 604. At least one of heat and pressure are applied to the blocking layer and the second layer to create a flow of the secondary adhesive to bond the blocking layer to the second layer using the secondary adhesive layer. Then at least one of heat and pressure are applied to the second layer and the first layer 602 to create the flow of adhesive from the adhesive layer 608.

Figure 7:
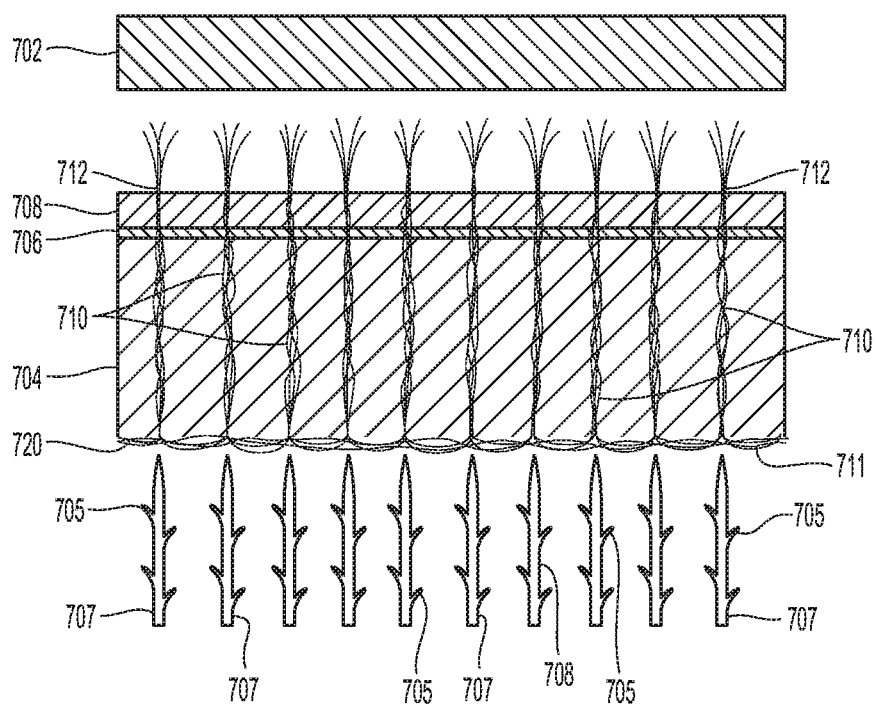
FIG. 7 is a schematic representation of a textile sheet with the blocking layer and adhesive layer pre-attached to the second layer using needle-punching.

Referring now to FIG. 7, in another embodiment, the blocking layer 706 and the adhesive layer 708 do not need to be adhesively pre-attached to the second layer 704 before the second layer is bonded to the first layer 702. Attachment of the blocking layer and the adhesive layer to the second layer is accomplished by forming a plurality of discrete fiber tufts 710 that run along the bottom face 711 of the second layer, through the second layer, blocking layer and adhesive layer. The result is a plurality of the ends 712 of the fiber tufts 710 extending past the adhesive layer. These ends of the fiber tufts are the ends of the discrete fibers in each fiber tuft. The plurality of discrete tufts is created by needle punching discrete fibers from the bottom face and through the second layer, blocking layer and adhesive layer. For example, a plurality of coarse needles 707 each containing a plurality of barbs 705 are punched from the bottom face 711 into the second layer 704, and continue through the blocking layer 706 and adhesive layer 708 to tie all three layers together before all of the layers, the first layer 702, the adhesive layer 708, the blocking layer 706 and the second layer 704, are bonded with heat and pressure.

Suitable methods for needle punching together layers are described in U.S. patent application Ser. No. 15/647,935 filed Jul. 12, 2017, the entire disclosure of which is incorporated herein by reference. In addition to providing attachment among the second layer, blocking layer and adhesive layer, the discrete fiber tufts also stabilize and strengthen the blocking layer and second layer and the resulting final laminate product containing the second layer, blocking layer and first layer.

Following attachment of the blocking layer and the adhesive layer to the second layer 704 using the plurality of discrete fiber tufts at least one of heat and pressure are applied to the first layer and second layer to create the flow of adhesive and to bond the first layer to the second layer. The heat and pressure also bond together the plurality of discrete fibers in the fiber tufts, embed the fiber tufts in the adhesive layer and bond the fiber tufts to the blocking layer and the first layer. In forming the plurality of discrete fibers passing through the second layer, blocking layer and adhesive layer, holes or penetrations are formed in the blocking layer. These penetrations allow a small flow of adhesive to pass through the blocking layer to the second layer upon application of the heat and pressure bonding the first layer to the second layer. The delamination resistance of the bonded layers is higher if the trailing ends 720 of the fiber tufts that run along the bottom face are also bonded with heat and pressure along the bottom face 711. In one embodiment, to facilitate bonding, the fiber tufts contain low melting fibers. In another embodiment, a layer of solid or liquid adhesive is added along the bottom face 711.

In one embodiment, the second layer 704, blocking layer 706 and adhesive layer 708 are joined by stitching the layers together with yarns extending through the layers. These yarns can be located at intervals equivalent to the intervals between needle penetrations shown in FIG. 7. In another embodiment, only the second layer 704 and blocking layer 706 are attached, e.g., using needle punching or stitch-bonding, and the adhesive layer 708 is then placed on the combined layers.

In one embodiment, the first layer 702 is a preformed textile face layer. Suitable preformed textile face layers include, but are not limited to, a tufted fabric, a woven fabric, a knit fabric, a needle-punched fabric, a spun-bonded fabric, a spun-laced fabric, a stitchbonded fabric and a pre-bonded carded fabric.

Figure 8:
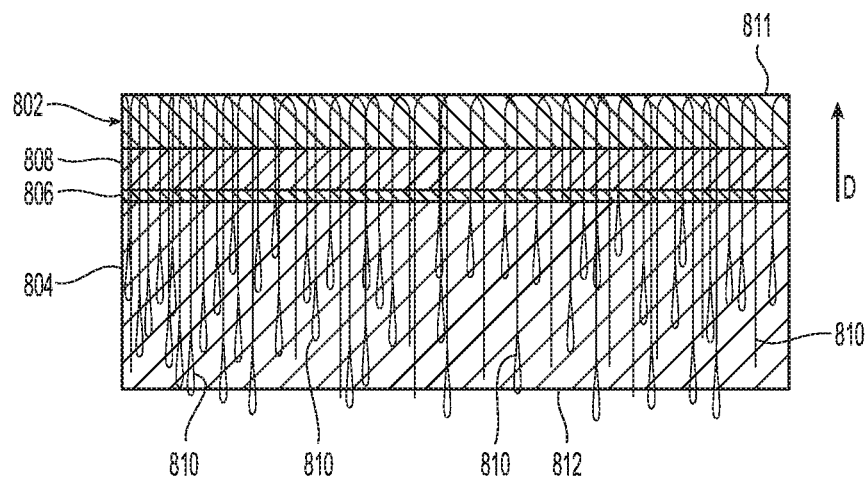
FIG. 8 is a schematic representation of a textile sheet with fibrous first and second layers, the adhesive layer and blocking layer combined with needle-punching.

Referring now to FIG. 8, exemplary embodiments are directed to using the adhesive layer and blocking layer to direct adhesive flow towards a preferred surface in the process of combining two fibrous layers 802 and 804 that contain staple fibers or continuous filaments fibers or mixtures of staple and continuous filaments. The adhesive layer 808 and blocking layer 806 are placed between the first layer and second layer such that the adhesive layer is disposed between the blocking layer and the first layer 802 and the blocking layer is disposed between the adhesive layer and the second layer 804. A plurality of fibers or loops 810 originating from the first layer 802 are needle punched through the adhesive layer and blocking layer and into the second layer before applying heat and pressure to create the flow of adhesive in the direction indicated by arrow D, to bond the first layer to the second layer, and to produce a highly resinous and extraordinarily abrasion resistant top face or surface 811. As illustrated, the driven fibers or loops may or may not protrude through the bottom face 812 of the second layer 804.

Figure 9:
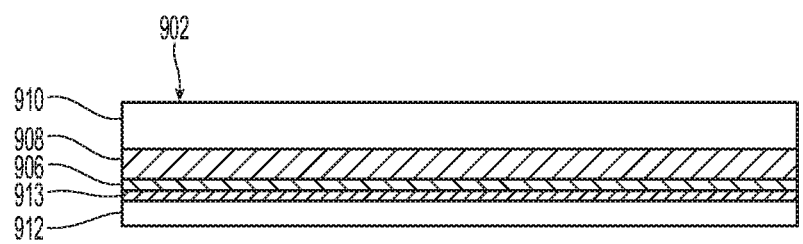
FIG. 9 is a schematic representation of a stich-bonded textile sheet containing an adhesive layer and blocking layer.

Referring now to FIG. 9, exemplary embodiments are directed to a method for directing adhesive within a stitch-bonded fabric 902. An adhesive layer 908 is placed in contact with or pre-attached to a blocking layer 906. In one embodiment, an additional substrate layer 913 is placed in contact with the blocking layer 906 opposite the adhesive layer 908. The additional substrate layer is optional. The blocking layer is capable of blocking the flow of the adhesive layer. In one embodiment, the blocking layer is a metal foil, for example, an aluminum foil. Yarns are then stitched through the combined adhesive layer and the blocking layer to form a technical front 910 and a technical back 912 of the stitchbonded fabric 902. In one embodiment as illustrated, the adhesive layer is disposed between the blocking layer and the technical front. Alternatively, the adhesive layer is disposed between the blocking layer and the technical back. The orientation of the adhesive layer and blocking layer is selected based on the desired direction of flow of adhesive toward either the technical front or the technical back. At least one of heat and pressure are applied to the stitchbonded fabric to create the flow of the adhesive layer. The blocking layer, as illustrated, directs the flow of adhesive toward the technical front.

Figure 10:
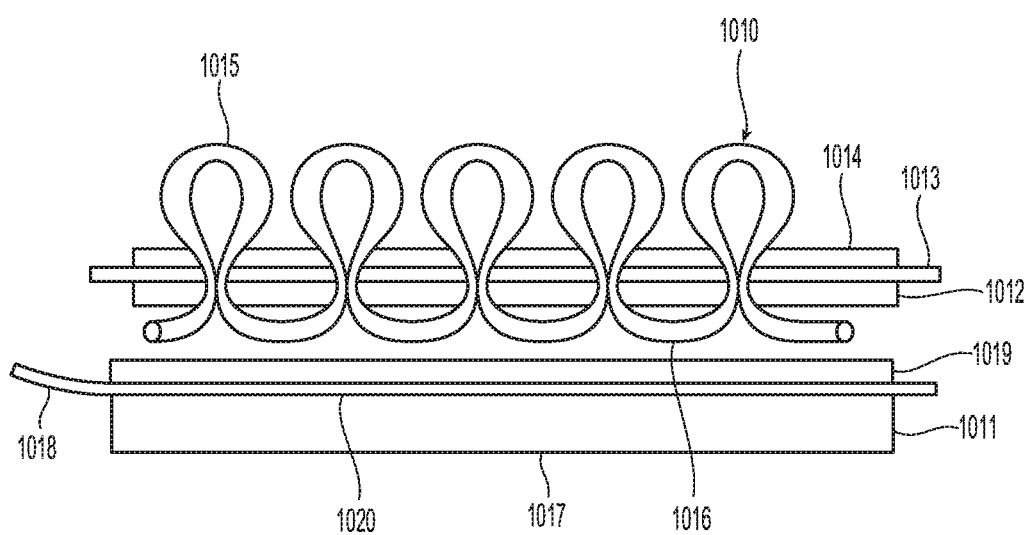
FIG. 10 is a schematic representation of a tufted sheet configured to be attached to a secondary backing layer.

Referring now to FIG. 10, in one embodiment, a first layer 1010 is attached to a second layer 1011. In one embodiment, the first layer 1010 is a specially constructed tufted fabric formed by combining a low-melting adhesive layer 1012 and a blocking layer 1013 with a primary backing 1014 during the tufting process. As illustrated, the blocking layer is located between the adhesive layer and the primary backing. The tufted pile loops 1015 and back-laps 1016 of the tufted fabric are formed by pushing yarns through all three layers. In one embodiment, the resulting tufted fabric is placed over an optional second adhesive layer 1019, and the second textile layer 1011. Heat and pressure are applied, preferably from the bottom 1017 to avoid crushing the pile 1015, and to force the flow of the adhesive layer 1012 within the tufted fabric and the flow of the secondary adhesive layer 1019 to envelop and bond the backlaps 1016, the primary backing layer 1014, and the second layer 1011 to each other.

In one embodiment, the first layer 1010 does not include the primary backing layer 1014, and the function of the primary backing layer is provided by the blocking layer 1013, which is suitably constructed. In another embodiment, the adhesive layer 1012, which is placed under the blocking layer within the tufted fabric, is sufficiently heavy to envelop all back-laps and bond all layers together, and therefore the secondary adhesive layer 1019 is not used. In one embodiment, a secondary blocking layer 1018 is pre-bonded to the upper surface 1020 of the second layer 1011. The secondary blocking layer bonds with either the secondary adhesive layer 1019 or the adhesive layer 1012.

In one embodiment, the arrangement and method illustrated by FIG. 10 is applied to stichbonded products, where the first textile layer is a stichbonded layer. Adhesive and blocking layers are similarly placed during the stitch-bonding process, for example, as described above in relation to FIG. 9. In another embodiment, the method is applied to a a needle-punched product by introducing blocking layers into the needle-punching process as described in relation to FIG. 8.

Examples

Figure 11:
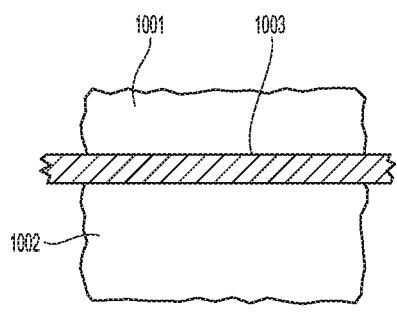
FIG. 11 is a schematic representation of a multi-layer textile sheet.

The following examples of multi-layered composites were created with various arrangements of layers to be bonded, adhesive layers and blocking layers to minimize stiffness and to limit the use of adhesive by directing adhesive to a surface or layer less compatible with the adhesive. Referring to FIG. 11, in one example, a stitchbonded fabric 1001 was conventionally laminated to a cushioning felt 1002 using a low-melting polyester adhesive layer 1003. The stitched-bonded fabric 1001 was prepared in accordance with U.S. Pat. No. 7,255,761 by stitching polyester yarns into a substrate of low-density polyethylene about 0.006 inches in thickness and pre-treated with a water repellent solution. The second layer or cushion 1002 was prepared by needle-punching a lapped carded web of 15 denier 3.5 inch polyester fibers to form a soft felt weighing 30 oz. per sq. yd. The adhesive layer 1003 was a dual layer of low-melt polyester web melting at approximately 125° C., with each individual layer weighing about 0.75 oz./sq. yd. for a total weight of about 1.5 oz./sq. yd.

The first and second layers were first bonded in the conventional manner by applying heat at about 400° F. with a pressure of 500 psi onto fabric layer 1001 for approximately 4 seconds. Adhesion and resistance to delamination for this example, and all examples, was evaluated by reheating one end of a 1 inch wide strip of a cooled composite sample to re-melt the adhesive and initiate delamination. The two separated parts were then pulled to determine the load needed to continue delaminating. The adhesion level of the fabric of this example was low, ranging between 1 and 2 lbs to delaminate the first layer fabric 1001 from the second layer felt 1002. The adhesive layer 1003 flowed almost entirely into the second layer felt 1002. Increasing one or more of the temperature, pressure and dwell time under pressure during bonding did not improve adhesion, with the adhesive layer continuing to be embedded primarily in the felt. For example, the weight of the adhesive layer 1003 was increased, but adhesion did not improve to a substantial degree until the adhesive weight was increased to 4.5 oz. per sq. yd., requiring approximately 5 lbs of force to separate the face layer from the cushion layer. The majority of adhesive was observed to have proceeded to the cushioning felt layer 1002.

Figure 12:
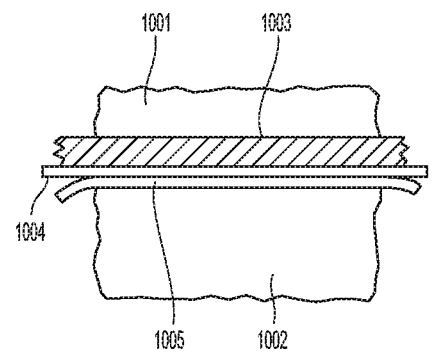
FIG. 12 is a schematic representation of the multi-layered textile sheet containing a blocking layer pre-attached to the second layer with adhesive.

Referring to FIG. 12, to improve adhesion and to reduce the amount of adhesive, the method described in relation to FIG. 6 was implemented. The second layer 1002, which was a felt, was first pre-bonded to a blocking layer 1004 that was a polyester film having a thickness of about 0.0005 inches thick (48 gauge) using a single secondary adhesive layer 1005 having a weight of about 0.75 oz./sq. yd. Direct heat at 125° F. and very low pressure, around 15 psi, was applied to the blocking layer, secondary adhesive layer and second layer. The affinity of the blocking layer 1004 to the adhesive allowed the formation of a very effective bond.

Following the initial bonding of the blocking layer to the second layer, adhesive layer 1003, having a weight of about 1.5 oz./sq. yd., was placed between the film-faced felt, i.e., the blocking layer covering second layer, and the first layer 1001. Heat and pressure at 400° F. and 500 psi were applied for 5 seconds. The resulting laminate had an increased delamination resistance from 1-2 lbs to 9-10 lbs with substantial penetration of the flow of adhesive into the lower strata of the face fabric of the first layer 1001.

Figure 13:
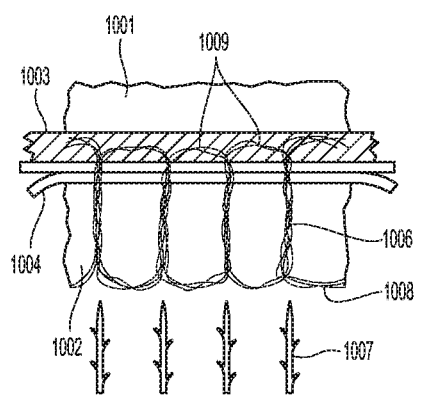
FIG. 13 is a schematic representation of the multi-layered textile sheet containing a blocking layer and adhesive layer pre-attached to the second layer with needle-punching.

Referring to FIG. 13, to improve adhesion and further reduce adhesive consumption the method described in relation to FIG. 7 was implemented. The blocking layer 1004 was attached to the second layer 1002 by driving a plurality of fiber tufts 1006 through the second layer and the blocking layer at a plurality of discrete locations. Therefore, the secondary adhesive layer was eliminated. The plurality of fiber tufts was used to first combine the second layer 1002 as well as the polyester film blocking layer 1004 with the adhesive layer 1003, which weighed only 1.5 oz. per sq. yd. The three layers were needle punched using 20 gauge needles 1007 inserted from the bottom 1008 of the second layer. The accumulated penetration density was about 18 penetrations per sq. cm. A plurality of discrete fibers 1009 from the plurality of fiber tufts 1006 originated from the bottom 1008 of the second layer and protruded through both the blocking layer and the adhesive layer.

Using the same lamination conditions (500 psi, 400° F. and 5 seconds) to laminate all layers, the fiber tufts 1006 were flattened, and the flattened ends overlapped as the flow of adhesive propagated into the first layer 1001, producing a very tight bond. The resulting laminated product required a force over 14 lbs to delaminate the layers. Compared to the conventionally laminated first and second layers of FIG. 11, the amount of adhesive required was reduced by 3.0 oz. per sq. yd., i.e., by ⅔, and delamination resistance improved by a factor of 5 by using the 0.07 oz./sq. yd. 48 gage low cost polyester blocking layer 1004.

Figure 14:
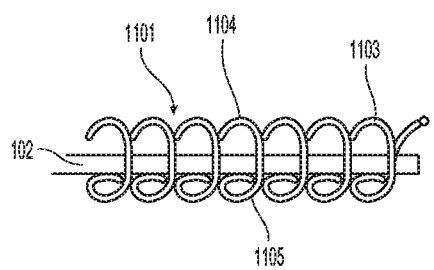
FIG. 14 is a schematic representation of a stitch-bonded textile sheet.

In another example, the flow of adhesive was directed within a stitch-bonded fabric to an outer surface of the fabric. In particular, a thin blocking layer was used within a stitch-bonded fabric to direct adhesive resin to a preferred face, i.e., the technical front or the technical back. Referring to FIG. 14, a stitch-bonded fabric 1101 was formed by stitchbonding an adhesive layer 1102 that was a low-melting low-density polyethylene film having a thickness of about 0.006 inches using 600 denier polyester yarns 1103 with a needle spacing (gauge) of 14/inch and a frequency (CPI) of 14 per inch in the machine direction, accumulating approximately 8 oz. per sq. yd. of yarn. The fabric was bulked by heating to 180° F. to shrink by approximately 18% in both directions using a process described in U.S. Pat. No. 7,255,761.

When the resulting stitch-bonded fabric was conventionally submitted to heat and pressure from either or both sides the polyethylene film initially melted, leaving the two surfaces mostly free of adhesive. When heat, pressure or dwell time under pressure was increased in an effort to bring resin selectively to the technical front 1104 or to the technical back 1105, adhesive propagated equally to both sides. Thickness and bulk were drastically reduced, and the fabric became very stiff.

Figure 15:
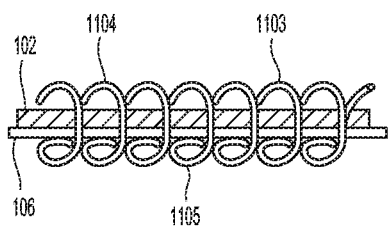
FIG. 15 is a schematic representation of the stitch-bonded textile sheet with a blocking layer adjacent the underlaps.

Referring to FIG. 15, the method described above in relation to FIG. 9 was implemented. A blocking layer 1106 was placed during stitch-bonding on the adhesive layer 1102 between the adhesive layer and the technical back 1105, blocking adhesive from proceeding to the technical back of the fabric. The blocking layer was a thin aluminum foil. After bulking, the fabric was subjected to the same level of heat, pressure and dwell time as the stitch-bonded fabric without the blocking layer, causing the flow of adhesive, i.e., the molten resin, to propagate mainly to the technical front 1104 leaving the technical back free of resin, and the fabric dramatically bulkier and softer. While a thin aluminum foil was used, the blocking layer can be any layer that melts above the melting point of the adhesive layer, for example, a layer of polyester film.

Figure 16:
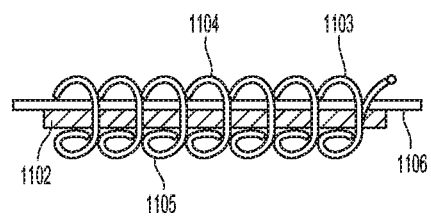
FIG. 16 is a schematic representation of the stitch-bonded textile sheet with a blocking layer adjacent the overlaps.

Referring to FIG. 16, the method described above in relation to FIG. 9 was similarly implemented to direct adhesive flow to the opposite technical back. The blocking layer 1106 was placed during stitch-bonding on the adhesive layer 1102 between the adhesive layer and the technical front 1104, blocking adhesive from proceeding to the technical front of the fabric. The blocking layer was a thin aluminum foil. After bulking, the fabric was subjected to the same level of heat, pressure and dwell time as stitch-bonded fabric without the blocking layer, causing the flow of adhesive, i.e., the molten resin, to propagate mainly to the technical back 1105 leaving the technical back free of resin, and the fabric dramatically bulkier and softer.

In another example, intermediate textile elements are secured by directing the flow of adhesive during the lamination of two or more layers, using one or more blocking layers. In general, a second layer that is a cushioning layer is attached to a first layer that is a tufted fabric using one or more adhesive layers and one or more blocking layers with special provisions to direct adhesive flow into and around the back-laps of the tufted yarns.

Figure 17:
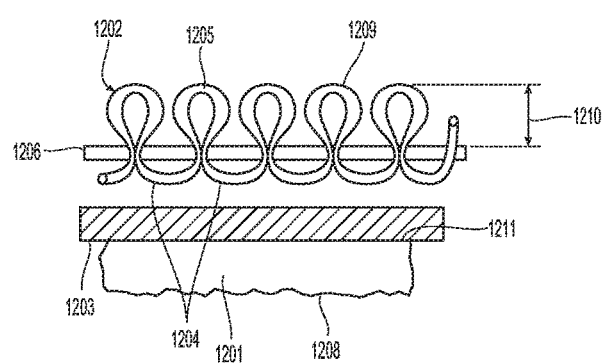
FIG. 17 is a schematic representation of a tufted face fabric textile sheet placed over an adhesive layer and a cushioning backing layer.

Referring to FIG. 17, a cushioning or non-cushioning second layer 1201 or backing is conventionally attached to a first layer 1202 using an adhesive layer 1203. Typically, the adhesive layer contains low viscosity adhesives, e.g., latexed polymers, that can penetrate around the back-laps 1204 of tufted pile yarns 1205 to secure the entire structure by inter-bonding with the primary backing layer 1206 of the tufted fabric.

The flow of adhesive, in particular at the presence of a relatively porous cushioning backing second layer 1201, is difficult to control. Therefore, extra adhesive is required to achieve "tuft bind" and to secure face pile tufts 1209 against stresses occurring during use of the textile product. The illustrated conventional textile product in FIG. 17 was prepared with tufted fabric 1202 formed with 1,200 denier polyester yarns 1205 tufted linearly into a polyester primary backing layer 1206, using approximately 9.0 oz. per sq. yd. of yarn weight. The tufted fabric was placed over the low melt adhesive layer 1203 containing two superposed layers of 0.006 inch thick polyethylene film. The tufted fabric and adhesive were placed over a second layer 1201 prepared with 15 denier polyester fibers 3.5 inches long, 0.150 inches thick and weighing 12 oz. per sq. yd. The total thickness of the three superposed layers 1201, 1202, 1203 was approximately 0.430 inches, and the "pile height" 1210 of face tufts over the primary backing layer 1206 was approximately 0.180 inches.

To avoid crushing the pile tufts, heat at the highest permissible temperature of 425° F. was applied from the backside 1208 of the second layer 1201 for 5 seconds to melt dual adhesive layer 1203 and to push adhesive simultaneously towards the upper surface 1211 of the second layer 1201, around the back-laps 1204, and against primary backing layer 1206. A pressure of 500 psi was required to achieve satisfactory delamination resistance at 7-8 lbs per inch of width, but tuft-bind was still poor at only 1-2 lbs before tufts would pull out. In addition, the pile height 1210 was reduced from 0.180 to 0.110 inches.

Figure 18:
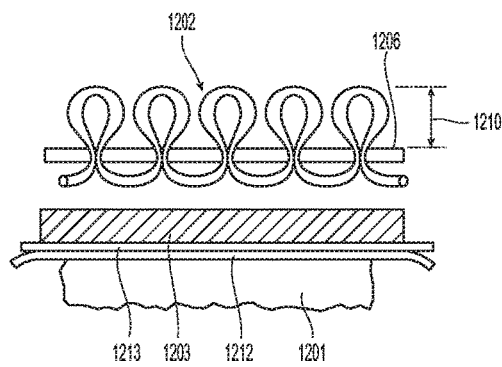
FIG. 18 is a schematic representation of a tufted face fabric textile sheet placed over an adhesive layer and a cushioning layer containing a blocking layer pre-attached to the cushioning layer using a separate adhesive layer.

Referring to FIG. 18, the method described above in relation to FIG. 6. was implemented. A thin blocking layer 1213 of 48 gauge polyester film having a thickness of 0.005 inches was pre attached to the second layer 1201 using a secondary adhesive layer 1212 of a very thin layer of 0.70 oz. per sq. yd. low-melt polyester adhesive. Then, the main adhesive layer 1203 of the same weight was placed between the blocking layer 1213 and the first layer 1202, i.e., the tufted structure. The tufted layer 1209 was then placed over the main adhesive layer 1203, and the same conditions of applied heat and pressure were used to laminate all layers. Tuft height 1210 was reduced from 0.180 inches to 0.130 inches. Tuft bind dramatically increased to approximately 6-7 lbs, producing an all-thermoplastic structure with good floor properties and was achieved by the addition of a total weight of only 1.4 oz./sq. yd. compared to the conventional textile product of FIG. 17.

Figure 19:
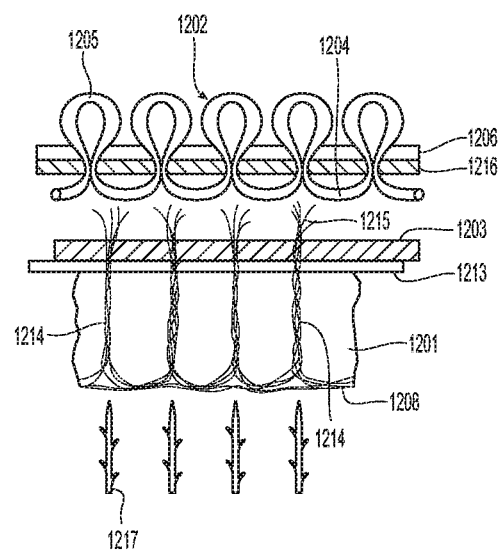
FIG. 19 is a schematic representation of a tufted face fabric textile sheet containing a blocking layer placed over the primary backing and over an adhesive layer integrated with a separate blocking layer and a cushioning layer using needle punching.

Referring to FIG. 19, additional improvements were achieved by directing the flow of adhesive from both above and below. The blocking layer 1213 was placed without pre-bonding between the second layer 1201 and the adhesive layer 1203, and the three layers were pre-attached by needle-punching a plurality of staple fiber tufts 1214 from the bottom 1208 of the second layer 1201, through blocking layer 1213 and adhesive layer 1203 to expose a plurality of fibers 1215 over the adhesive layer 1203. The adhesive layer 1203 was reduced from two layers to a single layer of 0.006 mil polyethylene. A secondary adhesive layer 1216 of 0.006 inch polyethylene was placed in contact with the primary backing 1206 during the tufting process of, placing it ultimately between the primary backing layer 1206 and the back-laps 1204.

The layers were combined by applying heat using the same temperature and dwell time; however, pressure was applied at only half the original pressure (250 psi). The result was a tuft-bind above 8 lbs and a delamination resistance of 12 lbs per inch of width. The pile height was essentially unchanged, down from the original 0.180 inches to 0.170 inches. The flow of adhesive to the second layer appeared minimal through the small perforations produced by the 25 gauge needle-punching needles 1217, whereas adhesive propagation through the larger holes produced by the tufting needles through the first layer 1206, and largely blocked by the penetrating yarns 1205, was visible but also limited. Compared to the layered product without a blocking layer of FIG. 17, the added weight was only approximately 0.75 oz. per sq. yd., attributable to the low-cost 48 gauge polyester film of the blocking layer 1213.

The process utilized in FIG. 19 can be reproduced with other textile structures replacing the illustrated tufted structure. These other textile structures include, but are not limited to, stitch-bonded fabrics that use blocking layers and adhesives layers added to or replacing the substrate layer as described in relation to FIG. 9, and needle-punched fabrics that add a blocking layer during the needle punching process as described in relation to FIG. 8.

In another example, the blocking layer is used to drive polymer to the surface of a needle-punched abrasion resistant sheet. The flow of polymer within a needle-punched structure prepared in accordance with the methods disclosed in U.S. Pat. No. 7,622,408 was directed towards an outer surface, according to the method described above in relation to FIG. 8, by the use of a thin blocking layer to produce superior abrasion resistance in a sheet using less polymer and reducing cost and stiffness. The resulting product is suitable for leather-like applications, wherein a very high level of abrasion resistance is required on the surface produced by embedding the tightly needled fibers in adhesive resin rising to the surface but not extensively beyond the top of the fibers and loops, to avoid a "plastic" effect and maintain a "leather-like" aesthetic.

Figure 20:
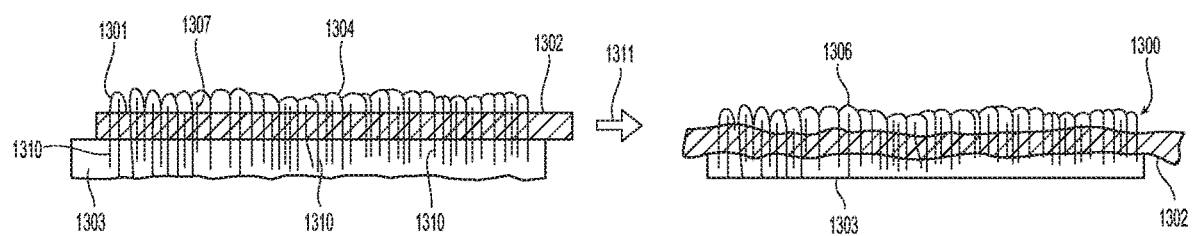
FIG. 20 is a schematic representation of a needle-punched multi-layered fabric sheet containing an internal adhesive layer.

Referring to FIG. 20, a plurality of relatively fine staple fibers 1310 is driven from a first layer 1301, for example, in accordance with the method described in U.S. Pat. No. 7,622,408, through a thermoplastic adhesive layer 1302 and into a second layer 1303 that is a support or cushion layer using fine needles and accumulating a large density of needle penetrations to create a large number of surface loops 1304 and upstanding fibers 1307. Heat is applied to the upper surface during step 1311 to produce the resulting composite 1300 having a dense and highly abrasion resistant composite surface 1306 with fiber ends and loops sharing the surface with the adhesive matrix resin without allowing the formation of a completely plastic surface. In this highly pre-integrated construction, the adhesive level is minimized even as the density of the surface is maximized to achieve high abrasion resistance without stiffening the product. Therefore, relatively costly elastic thermoplastic resins such as polyurethanes are preferred to preserve softness. Such resins, however, also have relatively high melt viscosities and present problems in impregnating the surface without using extreme temperatures or pressures. Extreme temperatures and pressures cause undesired deformation, bending down the upstanding fibers. Less expensive polyolefins with lower melt viscosities are preferred, but at the weights required to impregnate the surface the resulting product is a stiff product.

Continuing with FIG. 20, the product as illustrated was first prepared in accordance with the method disclosed in U.S. Pat. No. 7,622,408 using a carded first layer 1301 of 1.5 denier, 1.5 inch long polyester fibers weighing 5.5 oz. per sq. yd. The first layer was placed over a dual adhesive layer 1302 of polyethylene films. Each layer was 0.004 inches thick. The second layer 1303 containing the same polyester fibers as in the first layer 1301 was placed under the adhesive layer. The second layer was pre-needled using approximately 1000 penetrations per sq. cm with fine-gauge needles. The second layer 1301 had a weight of 11 oz. per sq. yd. and a thickness of 0.140 inches. Heat at 400° F. and pressure up to 3,000 psi were applied during step 1311 from above the first layer in order to drive the flow of adhesive to the upper surface 1306. The flow of adhesive resin penetrated into both the first and second layers, favoring the less-densified second layer 1303. The resulting product 1300 was quite stiff and had a total thickness of only 0.080 inches, smaller than the original thickness of the second layer 1303.

Figure 21:
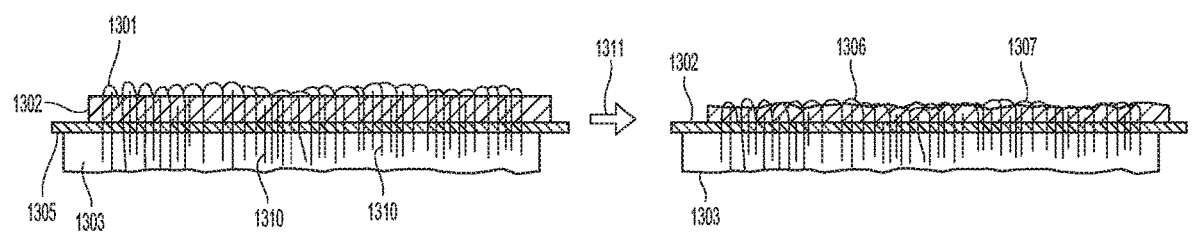
FIG. 21 is schematic representation of a needle-punched multi-layered fabric sheet containing an internal adhesive layer and blocking layer.

Referring now to FIG. 21, the method described above in relation to FIG. 8 was implemented. A blocking layer 1305 of a thin 48 gauge polyester film was placed under the adhesive layer 1302 before needle-punching the plurality of staple fibers through the first layer 1301, the adhesive layer 1302 and the second layer 1303. Heat and pressure was applied during step 1311, and adhesive propagated essentially exclusively upward to the upper surface 1306 and around the fibers 1307 at the surface using a pressure reduced down to 1500 psi. Furthermore, despite the lack of adhesion to the blocking layer 1305 due to the incompatibility of polyethylene and polyester, the resulting textile product was highly resistant to delamination and significantly softer than the equivalent textile product illustrated in FIG. 20. The thickness of the composite textile product was approximately 0.125 inches, slightly below the starting thickness of the second layer 1303.

In another example, the planar flow of adhesive and the distribution of adhesive are regulated using partially open blocking layers. A preformed partially-open blocking layer is used to regulate the distribution of the flow of adhesive in the planar direction and direct the flow of adhesive to move in the normal direction within the openings as two or more layers are inter-bonded using a contiguous adhesive layer.

Figure 22:
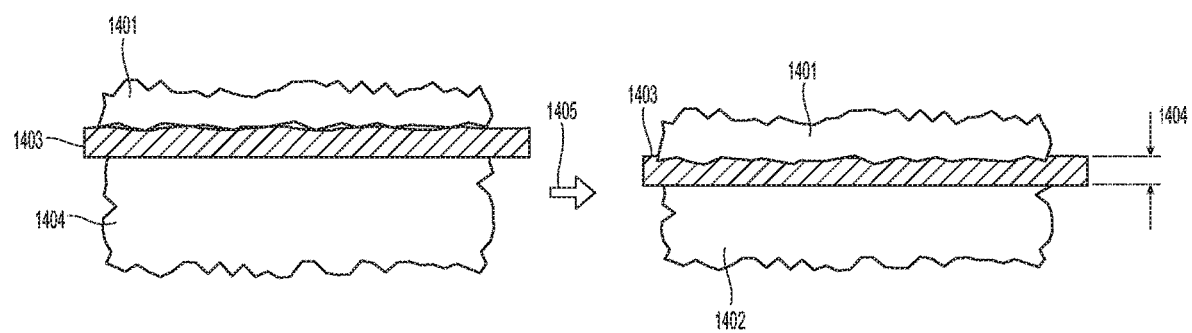
FIG. 22 is a schematic representation of a multi-layered textile sheet with an internal adhesive layer.

Referring now to FIG. 22, when two layers are conventionally inter-bonded with a substantial contiguous layer of adhesive, the interface zone between the layers and containing adhesive develops different thermal expansion and contraction properties than the two outer layers. As the resulting multi-layer textile composite cools down after lamination with heat or as temperature and humidity change during use, the multi-layer textile composite develops out-of-plane deformations, referred to as "curling" at the edges or "doming" in the middle. These out-of-plane deformations are caused by the differential expansion and contraction among the layers. Conventional solutions add substantial stabilizing layers such as glass, or counterbalance the deformations with additional layers of similar density located underneath or above the multi-layer textile composite, or texture the face layer and the adhesive-containing interface layer as exemplified in U.S. Pat. Nos. 7,425,359, 7,431,975, and 8,216,659, or combine a three-dimensional "spring like" face layer combined with a highly porous interface layer containing adhesive as exemplified in U.S. Pat. No. 9,243,359.

An alternative, lower-cost solution in accordance with embodiments discussed herein converts a flat composite blocking layer containing contiguous thermoplastic adhesive into a discontinuous and optionally three-dimensional form. A partially-open blocking layer is placed between the first layer and the second layer either above or below the adhesive layer. The blocking layer can be a pre-perforated film or an open scrim. The partially-open blocking layer allows the flow of molten adhesive to form bonds between the adjacent first and second layers only within the openings or perforations, creating a discontinuous composite interface layer. The flow of adhesive propagates a given distance into the layer adjacent to the blocking layer in the open areas and a further distance into that layer adjacent to the adhesive layer in the blocked areas creating a three-dimensional effect as the depth of penetration of adhesive varies across the layer to be bonded.

Continuing with FIG. 22, a first layer 1401, a second layer 1402 and a contiguous adhesive layer 1403 are combined, and heat and pressure are applied in step 1405. The resulting conventional textile composite has a contiguous interface layer with a uniform thickness 1404 and uniform while unequal penetration into the first layer and the second layer.

Figure 23:
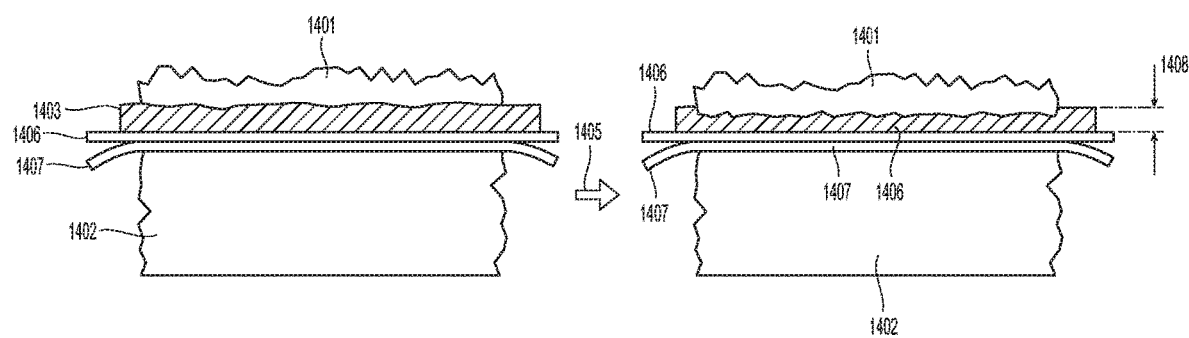
FIG. 23 is a schematic representation of a multi-layered textile sheet with an internal adhesive layer and a blocking layer pre-attached to a second layer with a secondary adhesive layer.

Referring to FIG. 23, the method described in relation to FIG. 6 was used to improve adhesion. A blocking layer 1406 is placed between the adhesive layer 1403 and the second layer 1402. The blocking layer is pre-attached to the second layer by a secondary adhesive 1407. Heat and pressure are applied in step 1405, resulting in a flow of adhesive forming a flat contiguous composite layer 1408 that is within the lower stratum of the first layer 1401 and containing adhesive. While bonding is produced with lower layers of adhesive using less adhesive, the resulting product is still susceptible to thermal deformation.

Figure 24:
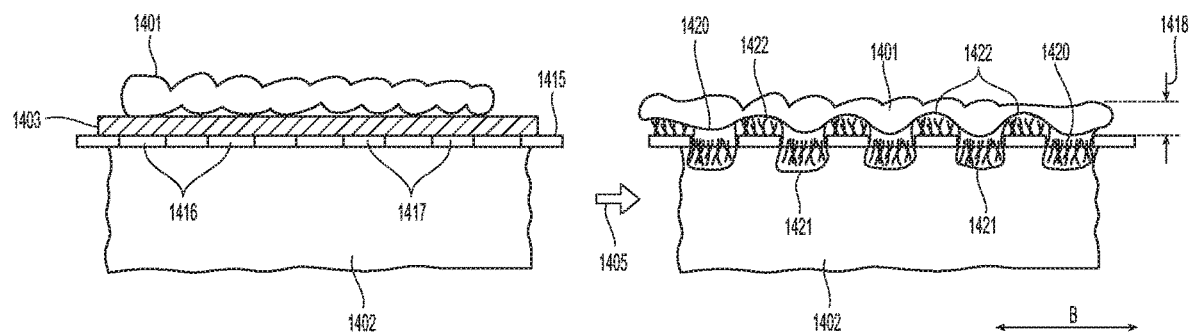
FIG. 24 is a schematic representation of a multi-layered textile sheet within an internal adhesive layer and a partially-open blocking layer between the adhesive layer and a second layer.

Referring now to FIG. 24, a partially-open blocking layer 1415 was attached to the adhesive layer 1403 between the adhesive layer and the second layer 1402. The partially-open blocking layer 1415 included a plurality of openings 1416 and a plurality of blocked areas 1417. When heat and pressure were applied 1405, the openings allowed a flow of adhesive to a first depth 1420 within the first layer and also at a plurality of discrete points 1421 within the second layer. The blocked portions of the partially-open blocking layer blocked the block of adhesive into the second layer and caused the flow of adhesive into the first layer to a second depth 1422 greater than the first depth. As a result, the stratum 1418 containing adhesive in the first layer and second layer is discontinuous and non-planar, relieving the planar stresses caused by temperature and humidity variations. The three-dimensionality is enhanced if one of the first layer and the adhesive layer that is placed adjacent to the blocking layer has low or no affinity for the flow of adhesive. This causes adhesive to also flow sidewise or laterally between the layer in the direction indicated by arrow B towards the open areas of the partially-open blocking layer 1415.

The openings in the blocking layer may be uniform and uniformly distributed or may vary in different areas to suit the needs of the final composite product, e.g., a carpet tile with more pliant non-warping edges. The blocking layer may be an integral sheet, a combination of parallel rectilinear or curvilinear strips, heavy yarns lined up in the longitudinal direction to relieve cross-directional stress or heavy yarns lined-up in the cross direction to relieve longitudinal stress. The strips and yarns can overlap, forming a virtual scrim. The scrim can contain woven or cross bonded strips or yarns or can be a cast contiguous scrim. The scrim can be positioned in a diagonal direction to the edges of the layers of material.

The partially-open blocking layer could also allow colored adhesive or resin to reach or to approach one of the surfaces in a decorative pattern. Although the example contained a single blocking layer, a plurality of partially-open blocking layers and a plurality of adhesive layers can be selectively placed among a plurality of layers to be bonded in more complicated patterns, causing the formation of various three-dimensional final adhesive cross-sections. In addition, the layers can be used to produce interrupted bond patterns in a layered structure containing additional elements that are shrinkable upon further unconstrained heating to a higher temperature, producing bulked/three dimensional products.

The foregoing written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for directing adhesive when bonding layers, the method comprising:
    placing an adhesive layer between a first layer and a second layer;
    placing a blocking layer between the adhesive layer and at least a portion of the second layer, the first layer less compatible with the adhesive than the second layer or less permeable than the second layer, the blocking layer at least partially blocking a flow of the adhesive layer toward the portion of the second layer; and
    applying at least one of heat and pressure to create the flow of the adhesive layer to bond the first layer to the second layer using the adhesive layer.

2. The method of claim 1, wherein:
    the method further comprises attaching at least one of the blocking layer and the adhesive layer to the second layer before applying at least one of heat and pressure to bond the first layer to the second layer using the adhesive layer.

3. The method of claim 2, wherein attaching at least one of the blocking layer and the adhesive layer to the second layer comprises forming a plurality of discrete fiber tufts extending along a bottom face of the second layer, through the second layer, blocking layer, and the adhesive layer.

4. The method of claim 3, wherein forming the plurality of discrete fibers comprises needle punching the discrete fibers from the bottom face and through the second layer, blocking layer and adhesive layer.

5. The method of claim 2, wherein attaching at least one of the blocking layer and the adhesive layer to the second layer comprises:
    placing a secondary adhesive layer between the second layer and the blocking layer; and
    applying heat and pressure to the blocking layer and second layer to bond the blocking layer to the second layer using the secondary adhesive layer.

6. The method of claim 2, wherein attaching at least one of the adhesive layer and blocking layer to the second layer comprises stitching at least one of the adhesive layer and the blocking layer to the second layer.

7. The method of claim 1 wherein the blocking layer comprises a partially open layer or a perforated layer.

8. The method of claim 1 wherein:
the adhesive layer comprises a thermoplastic layer comprising an adhesive layer melting point;
the first layer comprises a first layer melting point;
the second layer comprises a second layer melting point;
the blocking layer comprises a blocking layer melting point, the adhesive layer melting point lower than the first layer melting point, the second layer melting point and the blocking layer melting point; and
applying at least one of heat and pressure comprising using a bonding temperature greater than or equal to the adhesive layer melting point and less than the first layer melting point, the second layer melting point and the blocking layer melting point.

9. The method of claim 1, wherein placing the adhesive layer comprises placing a liquid adhesive layer.

10. The method of claim 1, wherein placing the blocking layer comprises placing the blocking layer between the adhesive layer and all of the second layer.

11. The method of claim 1, wherein the first layer comprises a stitch-bonded fabric, a tufted fabric, a needle-punched fabric, a nonwoven fabric, a non-fibrous layer, cardboard, expanded polystyrene, a metal foil, a metal screen, a plastic, a polymer or an elastomer.

12. The method of claim 1, wherein the second layer comprises a stitch-bonded fabric, a tufted fabric, a needle-punched fabric, a nonwoven fabric, a non-fibrous layer, cardboard, expanded polystyrene, a metal foil, a metal screen, a plastic, a polymer or an elastomer.

13. The method of claim 1, wherein, the first layer comprises a preformed textile face layer comprising a tufted fabric, a woven fabric, a knit fabric, a needle-punched fabric, a spun-bonded fabric, a spun-laced fabric, a stitch-bonded fabric or a pre-bonded carded fabric.

14. The method of claim 1, wherein:
the first layer comprises a plurality of staple fibers;
the second layer comprises a plurality of staple fibers; and
the method further comprises needle punching staples fibers from the first layer, through the adhesive layer and blocking layer and into the second layer before applying at least one of heat and pressure.

15. The method of claim 1, wherein the blocking layer comprises blocking areas that block a flow of the adhesive layer toward the portion of the second layer and open areas that allow the flow of the adhesive layer toward the first layer and the second layer.

16. The method of claim 1, wherein the blocking layer comprises a perforated film, a plurality of separate strips of material spaced from each other or a scrim formed by combining a plurality of yarns.

17. The method of claim 1, wherein the blocking layer comprises a polyester film comprising a thickness of about 0.0005 inches.

18. The method of claim 1, wherein the blocking layer comprises a variable thickness between the first layer and the second layer.

19. A method for directing adhesive within a stitchbonded fabric, the method comprising:
placing an adhesive layer in contact with a blocking layer, the blocking layer at least partially blocking a flow of the adhesive layer;
stitching yarns through the adhesive layer and the blocking layer to form a technical front and a technical back of the stitchbonded fabric; and
applying at least one of heat and pressure to create a flow of the adhesive layer, the blocking layer directing the flow of adhesive toward one of the technical front and the technical back.

20. The method of claim 19, wherein placing the adhesive layer in contact with the blocking layer further comprises placing two separate adhesive layers in contact with the blocking layer such that the blocking layer is disposed between the adhesive layers.

21. The method of claim 20, further comprising attaching the blocking layer to the adhesive layers before stitching yarns through the adhesive layer.

22. The method of claim 19, wherein the blocking layer comprises a metal foil.

23. The method of claim 19, further comprising attaching the blocking layer to the adhesive layer before stitching yarns through the adhesive layer.

24. A method for forming a composite with a fabric layer, the method comprising:
pushing yarns through at least one of a blocking layer, an adhesive layer and a primary backing to form the fabric layer;
placing the fabric layer in contact with a second layer; and
applying heat and pressure to bond at least one of the blocking layer, the adhesive layer and primary backing in the fabric layer and to bond the fabric layer to the second layer.

25. The method of claim 24, wherein the method further comprises:
attaching a secondary blocking layer to the second layer;
placing a secondary adhesive layer on the secondary blocking layer; and
placing the fabric layer over the secondary adhesive layer with the yarns in contact with the secondary adhesive layer.

26. The method of claim 25, wherein pushing yarns through the at least one of the blocking layer, the adhesive layer and primary backing to form the fabric layer comprises tufting the yarns through the at least one of the blocking layer, the adhesive layer and primary backing to form the fabric layer.

27. The method of claim 25, wherein pushing yarns through the at least one of the blocking layer, the adhesive layer and primary backing to form the fabric layer comprises stitchbonding the yarns through the at least one of the blocking layer, the adhesive layer and primary backing to form the fabric layer.

28. The method of claim 25, wherein pushing yarns through the at least one of the blocking layer, the adhesive layer and primary backing comprises needle punching.

29. A method of directing a low melting adhesive flow towards a surface of a composite fabric comprising:
placing a blocking layer and a low-melting adhesive layer adjacent to a filament web;
needlepunching the filament web into the blocking layer and the adhesive layer; and
applying heat and pressure to the filament web, blocking layer and adhesive layer, creating a flow of molten adhesive from the adhesive layer away from the blocking layer.

30. The method of claim 29, wherein placing a blocking layer and a low-melting adhesive layer adjacent to a filament web comprises placing the blocking layer and low-melting adhesive layer between a pair of filament webs.

* * * * *